(12) United States Patent
Takanashi et al.

(10) Patent No.: US 7,044,751 B2
(45) Date of Patent: May 16, 2006

(54) CONSTRUCTION FOR CONNECTING A CIRCUIT BOARD AND AN ELECTRICAL PART, A BRAKE OIL PRESSURE CONTROL UNIT

(75) Inventors: Hitoshi Takanashi, Mie (JP); Takao Tsunooka, Aichi (JP); Yasuhito Sekihara, Aichi (JP)

(73) Assignees: Sumito Wiring Systems, Ltd. (JP); ADVICS Co., Ltd. (JP)

( * ) Notice: Subject to any disclaimer, the term of this patent is extended or adjusted under 35 U.S.C. 154(b) by 48 days.

(21) Appl. No.: 10/912,612

(22) Filed: Aug. 5, 2004

(65) Prior Publication Data

US 2005/0032402 A1     Feb. 10, 2005

(30) Foreign Application Priority Data

Aug. 8, 2003   (JP)   ............................. 2003-290640

(51) Int. Cl.
*H01R 12/00*   (2006.01)
(52) U.S. Cl. .................... 439/76.2; 439/247; 439/558; 439/547
(58) Field of Classification Search ........ 439/546–549, 439/557, 558, 76.2, 247, 248
See application file for complete search history.

(56) References Cited

U.S. PATENT DOCUMENTS

| | | | | |
|---|---|---|---|---|
| 3,912,355 A | * | 10/1975 | Curado et al. | 439/546 |
| 4,909,748 A | * | 3/1990 | Kozono et al. | 439/247 |
| 5,263,871 A | * | 11/1993 | Sano | 439/157 |
| 5,320,539 A | * | 6/1994 | Haskins | 439/56 |
| 5,407,363 A | * | 4/1995 | Polgar et al. | 439/546 |
| 5,545,058 A | * | 8/1996 | Albrecht | 439/547 |
| 5,890,912 A | * | 4/1999 | Jenkins | 439/57 |
| 6,155,874 A | * | 12/2000 | Endo et al. | 439/547 |
| 6,551,133 B1 | * | 4/2003 | Tsukamoto et al. | 439/549 |
| 6,719,267 B1 | * | 4/2004 | Torii et al. | 251/129.15 |

FOREIGN PATENT DOCUMENTS

JP     2000-159084     6/2000

* cited by examiner

*Primary Examiner*—Gary Paumen
(74) *Attorney, Agent, or Firm*—Gerald E. Hespos; Anthony J. Casella

(57) ABSTRACT

A first electronic control unit (10) provided with a printed circuit board (13) and a second electronic control unit (E) having pressure sensors (30) mounted therein can be assembled with each other. Intermediate connectors (40) are mounted in the first electronic control unit (10), and terminal fittings (42) are accommodated therein. Each terminal fitting (42) is provided with a board-side connecting portion (53) to be soldered to the printed circuit board (13) and a resilient contact piece (51) to be resiliently brought into contact with a terminal portion (32) of the pressure sensor (30).

6 Claims, 19 Drawing Sheets ized separately in an automotive vehicle. However, consideration has been given to assembling two electronic control units into an integral unit to achieve miniaturization. Some electronic control units are designed to precisely control oil pressure and have a pressure sensor for detecting oil pressure during a brake oil pressure control. In such a case, there is an increasing necessity to connect the pressure sensor with a printed circuit board accommodated in a mating electronic control unit as two electronic control units are assembled into an integral unit. To this end, as diagrammatically shown in FIG. 19, terminals 3a of a pressure sensor 3 are connected fixedly with a printed circuit board 4 by soldering after two electronic control units 1, 2 are assembled.

CONSTRUCTION FOR CONNECTING A CIRCUIT BOARD AND AN ELECTRICAL PART, A BRAKE OIL PRESSURE CONTROL UNIT

BACKGROUND OF THE INVENTION

1. Field of the Invention

The invention relates to a construction for connecting a circuit board and an electrical part, to a brake oil pressure control unit and to a method of connecting a circuit board and an electrical part.

2. Description of the Related Art

Electronic control units normally are installed separately in an automotive vehicle. However, consideration has been given to assembling two electronic control units into an integral unit to achieve miniaturization. Some electronic control units are designed to precisely control oil pressure and have a pressure sensor for detecting oil pressure during a brake oil pressure control. In such a case, there is an increasing necessity to connect the pressure sensor with a printed circuit board accommodated in a mating electronic control unit as two electronic control units are assembled into an integral unit. To this end, as diagrammatically shown in FIG. 19, terminals 3a of a pressure sensor 3 are connected fixedly with a printed circuit board 4 by soldering after two electronic control units 1, 2 are assembled.

Japanese Unexamined Patent Publication No. 2000-159084 and Japanese Unexamined Patent Publication No. 2002-243056 disclose electronic control units to be installed in automotive vehicles.

An abnormality may occur in one of the electronic control units. In this situation, it is desirable to separate the two electronic control units 1, 2 and to replace only the electronic control unit that has the abnormality. However, the terminals 3a of the pressure sensor 3 are soldered to the printed circuit board 4, and it difficult to detach the two electronic control units 1, 2. Thus, both electronic control units 1, 2 need to be exchanged, which leads to a higher cost.

The present invention was developed in view of the above problem and an object thereof is to realize a low-cost performance by enabling the easy detachment of only either one of two units.

SUMMARY OF THE INVENTION

The invention relates to a construction for electrically connecting a circuit board in a first unit box and an electrical part in a second unit box as the first and second unit boxes are assembled. An intermediate connector is provided in the first unit box and has at least one terminal fitting with a first portion inseparably connectable with the circuit board and a second portion separably connectable with a terminal of the electrical part. Thus, the connected state of the terminal fitting and the circuit board need not be canceled upon detaching the two unit boxes, and the detaching operation can be performed easily.

The two unit boxes may be displaced in a direction intersecting the assembling direction during assembly of the two unit boxes. Accordingly, the intermediate connector preferably is mounted in the first unit box via a displacement take-up means for resiliently displacing the intermediate connector relative to the first unit box in a direction intersecting the assembling direction of the two unit boxes. The displacement take-up means enables the intermediate connector to be displaced relative to the first unit box in the direction intersecting the assembling direction, thereby taking up the displacement of the two unit boxes. Thus, the terminal of the electrical part can be connected smoothly with the terminal fitting of the intermediate connector.

The intermediate connector preferably is mounted with the terminal fitting inserted through a mounting portion in a unit main body of the first unit box. The displacement take-up means includes at least one resilient piece on one of the intermediate connector and the unit main body. The resilient piece is resiliently deformable in the direction intersecting the assembling direction. The displacement take-up means also has a receiving portion on the other of the intermediate connector and the unit main body for receiving the resilient piece.

The intermediate connector preferably includes at least one holding portion engageable with the mounting portion as the intermediate connector is turned by a specified angle along a circumferential direction after being inserted into the mounting portion. The resilient piece extends substantially along the circumferential direction of the intermediate connector and is engageable with a side of the mounting portion substantially opposite from the side where the holding portion is to be engaged with the mounting portion.

The intermediate connector is inserted into the mounting portion and is turned by the specified angle to engage the holding portion with the mounting portion. On the other hand, the resilient piece is engaged with the side of the mounting portion opposite from the side engaged with the holding portion. Thus, the intermediate connector can be held on the unit main body. In this holding sate, the resilient piece received by the receiving portion is deformed resiliently to take up the displacement during assembly of the two unit boxes.

The resilient piece preferably extends substantially along the assembling direction of the two unit boxes and includes a resiliently deformable arm and a lock engageable with a side of the mounting portion substantially opposite from the side where the intermediate connector is to be mounted.

At least one of the lock and the mounting portion preferably has a guiding surface for guiding the arm through a resilient deformation as the intermediate connector is mounted along the assembling direction of the two unit boxes.

The arm is guided by the guiding surface and deforms resiliently as the intermediate connector is mounted into the mounting portion along the assembling direction of the two unit boxes. The arm then restores resiliently so that the lock engages the mounting portion. Thus, the resilient piece received by the receiving portion is deformed resiliently to take up the displacement.

The invention also relates to a brake oil pressure control unit that comprises the above-described construction for connecting a circuit board and an electrical part.

The construction of the subject invention is simplified since the resilient piece possesses a function of holding the intermediate connector in addition to a function of taking up the displacement.

The invention also relates to a method for assembling the two unit boxes after the intermediate connector is mounted into the first unit box and for connecting the intermediate connector with the electrical part before the two unit boxes are assembled. As a result, the assembling method can be diversified.

The invention further relates to a method of electrically connecting an electrical part and a circuit board, comprising the steps of providing the circuit board in a first unit box and providing the electrical part in a second unit box. The method also includes mounting an intermediate connector in the first unit box. The intermediate connector comprises at least one terminal fitting having a first portion inseparably connected with the circuit board and a second portion separably connected with a terminal portion of the electrical part. The method continues by assembling the first and second unit boxes to connect the electrical part and the circuit board.

The step of mounting the intermediate connector in the first unit box includes providing a displacement take-up means that is resiliently displaceable relative to the first unit box in a direction intersecting an assembling direction of the two unit boxes.

The step of mounting the intermediate connector preferably comprises inserting the terminal fitting through a mounting portion provided in a unit main body of the first unit box. The displacement take-up means preferably includes at least one resilient piece provided on one of the intermediate connector and the unit main body for resilient deformation in the direction intersecting the assembling direction, and a receiving portion provided on the other of the intermediate connector and the unit main body for receiving the resilient piece.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A first embodiment of the invention is described with reference to FIGS. 1 to 10. The first embodiment shows a brake oil pressure control unit which is an integral or unitary assembly of two electronic control units 10, E and to be installed in an automotive vehicle. In the following description, reference is made to FIG. 2 and other figures concerning vertical direction.

Figure 1:
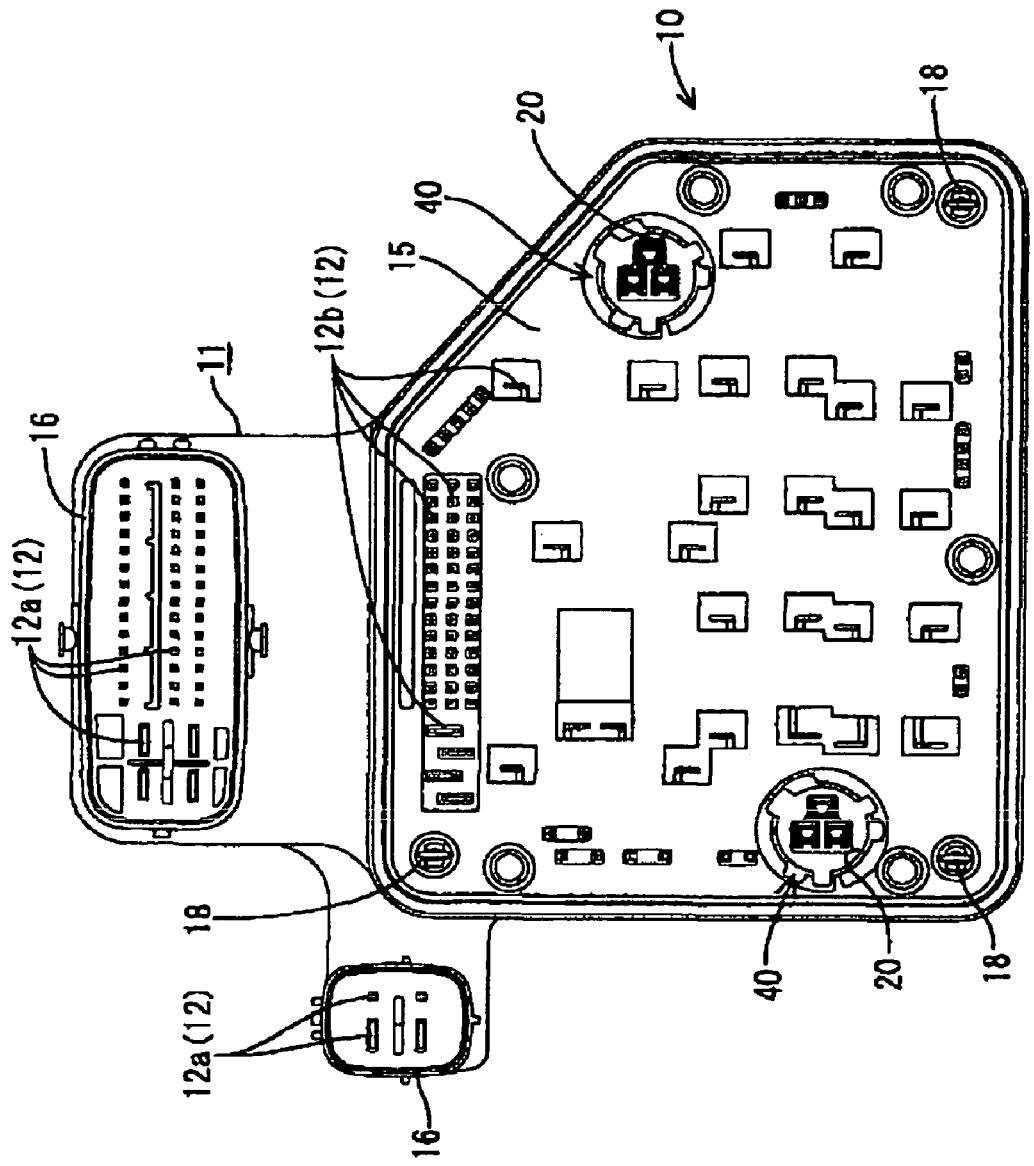
FIG. 1 is a plan view of a unit main body of a first electronic control unit according to a first embodiment of the invention.
Figure 2:
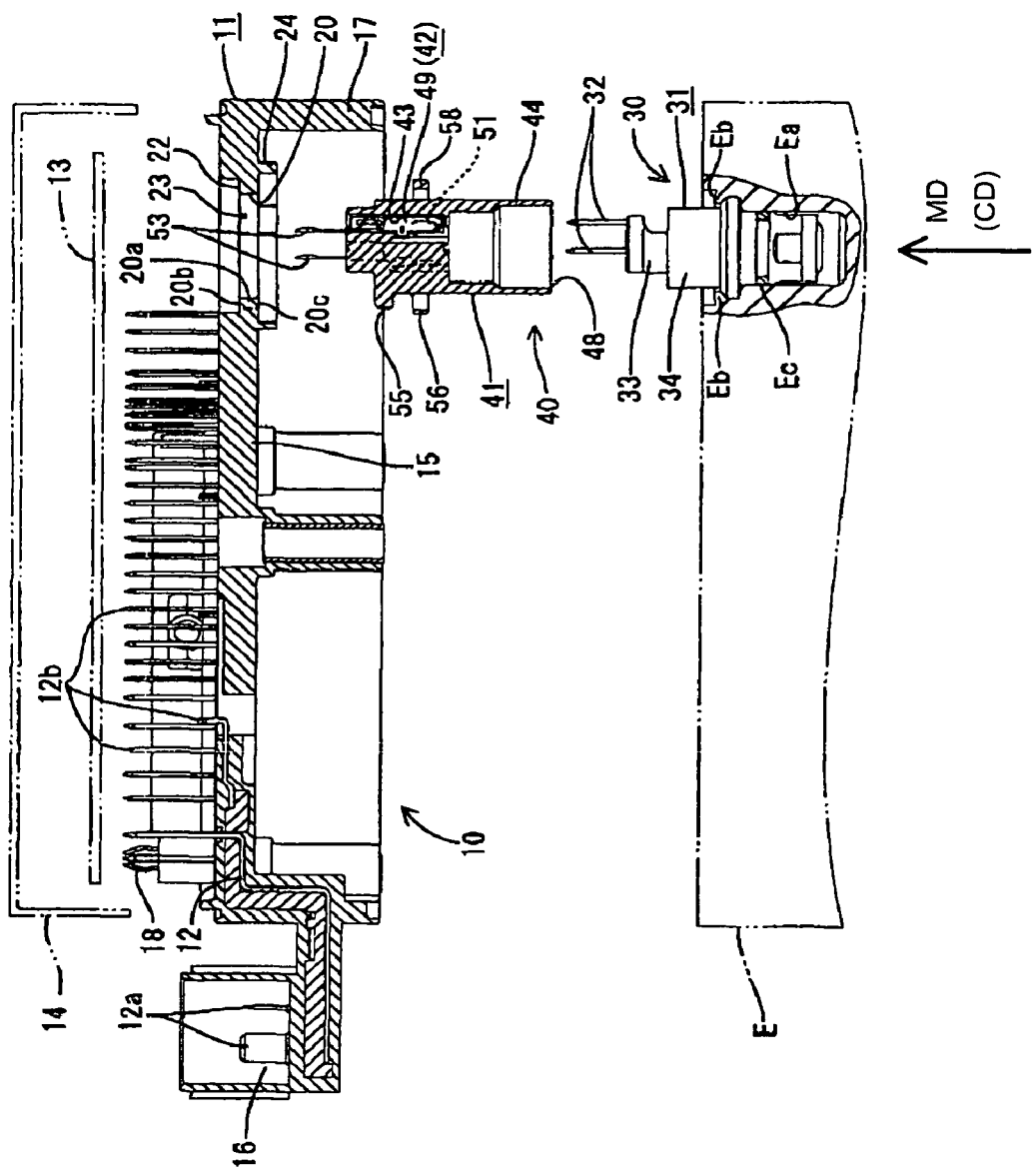
FIG. 2 is an exploded side view in section of the first and second electronic control units.

As shown in FIGS. 1 and 2, the first electronic control unit 10 is comprised of a unit main body 11 having busbars 12 built therein, an electronic circuit comprising a printed circuit board 13 to be mounted on the upper surface of the unit main body 11, and a cover 14 to be put on the upper surface of the unit main body 11 to at least partly cover the printed circuit board 13.

The unit main body 11 has busbars 12 embedded at least partly one over another in a resin member, and includes a board mounting portion 15 on which the printed circuit board 13 and the cover 14 are to be mounted. The unit main body 11 also has connector portions 16 at positions on outer sides of the board mounting portion 15 for receiving unillustrated external connectors. A first end of each busbar 12 serves as a connector-side connecting portion 12a projecting up in the connector portion 16 for connection with the external connector. The second end thereof serves as a device-side connecting portion 12b projecting up in the board mounting portion 15 for connection with a device, such as the printed circuit board 13 or an unillustrated coil. The printed circuit board 13 has conductive paths (not shown) of copper foil printed thereon to form electric/electronic circuitry and has insertion holes into which the corresponding device-side connecting portions 12b are insertable. The device-side connecting portions 12b are to be connected with the conductive paths by soldering, welding, clamping, insertion fitting or the like. A device accommodating portion 17 for accommodating intermediate connectors 40 and/or coils is formed in the bottom surface of the board mounting portion 15 and has a substantially tubular shape with an open bottom. Board holding portions 18 project up on the upper surface of the board mounting portion 15 for holding the printed circuit board 13 mounted.

The second electronic control unit E is assembled with the bottom side of the first electronic control unit 10, and can be held integrally with the first electronic control unit 10 by means of an unillustrated holding means (for example, bolts and nuts). Two pressure sensors 30 (only one is shown) for detecting an oil pressure during a brake oil pressure control are mounted on the upper surface of the second electronic control unit E and project substantially upward. Each pressure sensor 30 includes a sensor main body 31 internally provided with an unillustrated pressure detector, and three terminals 32 connected with the pressure detector and projecting up substantially along a connecting direction CD from the sensor main body 31 (see FIG. 2: only two terminal portions are shown in FIG. 2). The terminals 32 are to be connected electrically with the printed circuit board 13 via the intermediate connector 40. An upper part of the sensor main body 31 has a small-diameter portion 33 and a large-diameter portion 34 both having substantially cylindrical shapes coupled one over the other. The terminals 32 project from the small-diameter portion 33. This pressure sensor 30 is accommodated in a sensor accommodating chamber Ea formed in the upper surface of a metal (e.g. aluminum) casing substantially covering the second electronic control unit E. The sensor main body 31 is fixed to the second electronic control unit E by fixing pieces Eb obtained by forming a projection in the upper surface of a surrounding wall of the sensor accommodating chamber Ea and forcibly deforming this projection by a jig. Further, a seal ring Ec fitted on the outer circumferential surface of the sensor main body 31 provides sealing by the close contact thereof with the outer circumferential surface of the sensor main body 31 and the inner circumferential surface of the sensor accommodating chamber Ea.

The intermediate connectors 40 for electrically connecting the pressure sensors 30 fixed to the second electronic control unit E with the printed circuit board 13 are mountable into the first electronic control unit 10. The board mounting portion 15 of the unit main body 11 is formed with one or more, preferably two openings 20 used to mount the respective intermediate connectors 40 (see FIG. 1). The intermediate connectors 40 are mounted substantially along a mounting direction MD substantially parallel to the connecting direction CD while vertically passing through the corresponding openings 20.

Figure 3A:
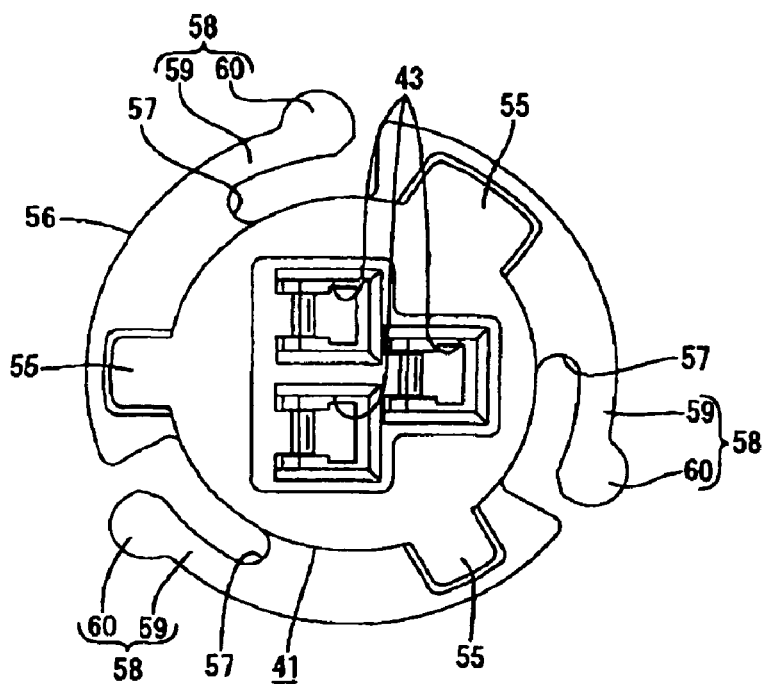
FIGS. 3(A) and 3(B) are a plan view and a bottom view of a connector housing.
Figure 3B:
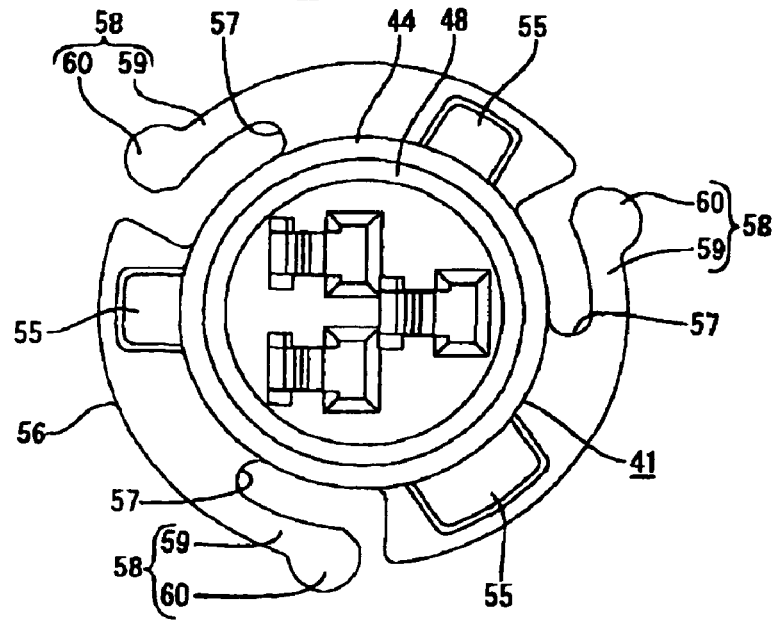
Figure 4:
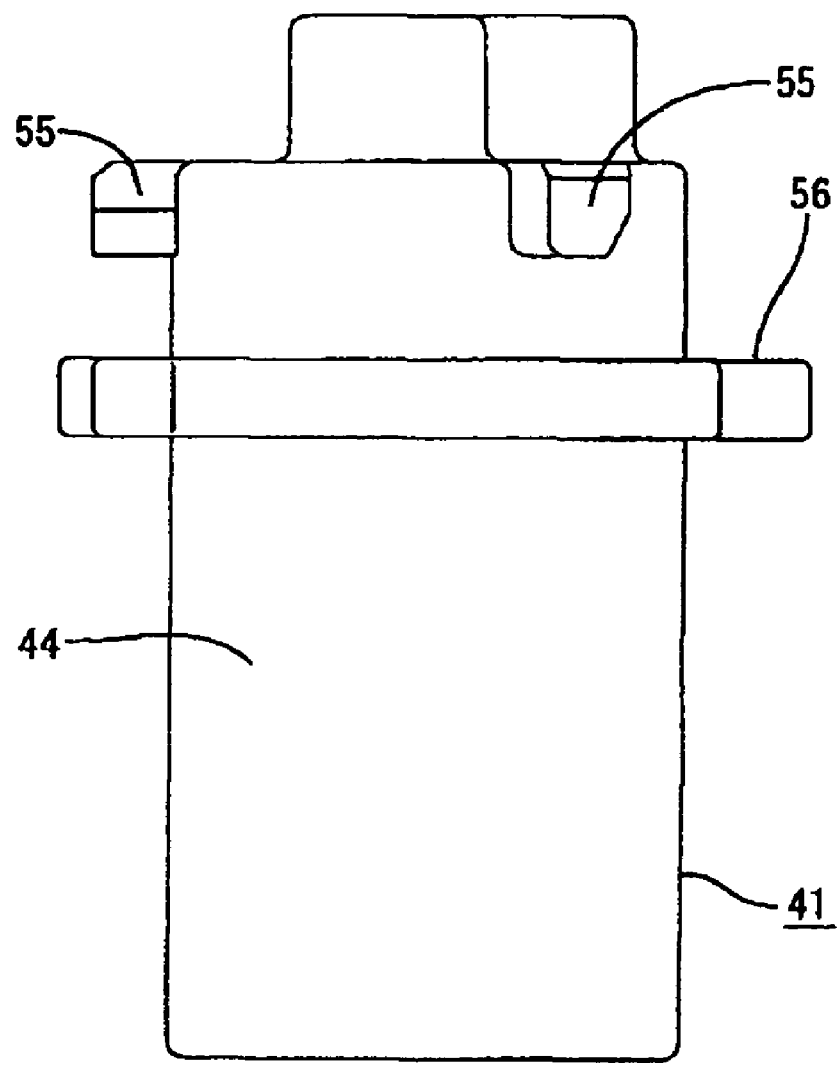
FIG. 4 is a side view of the connector housing.
Figure 5:
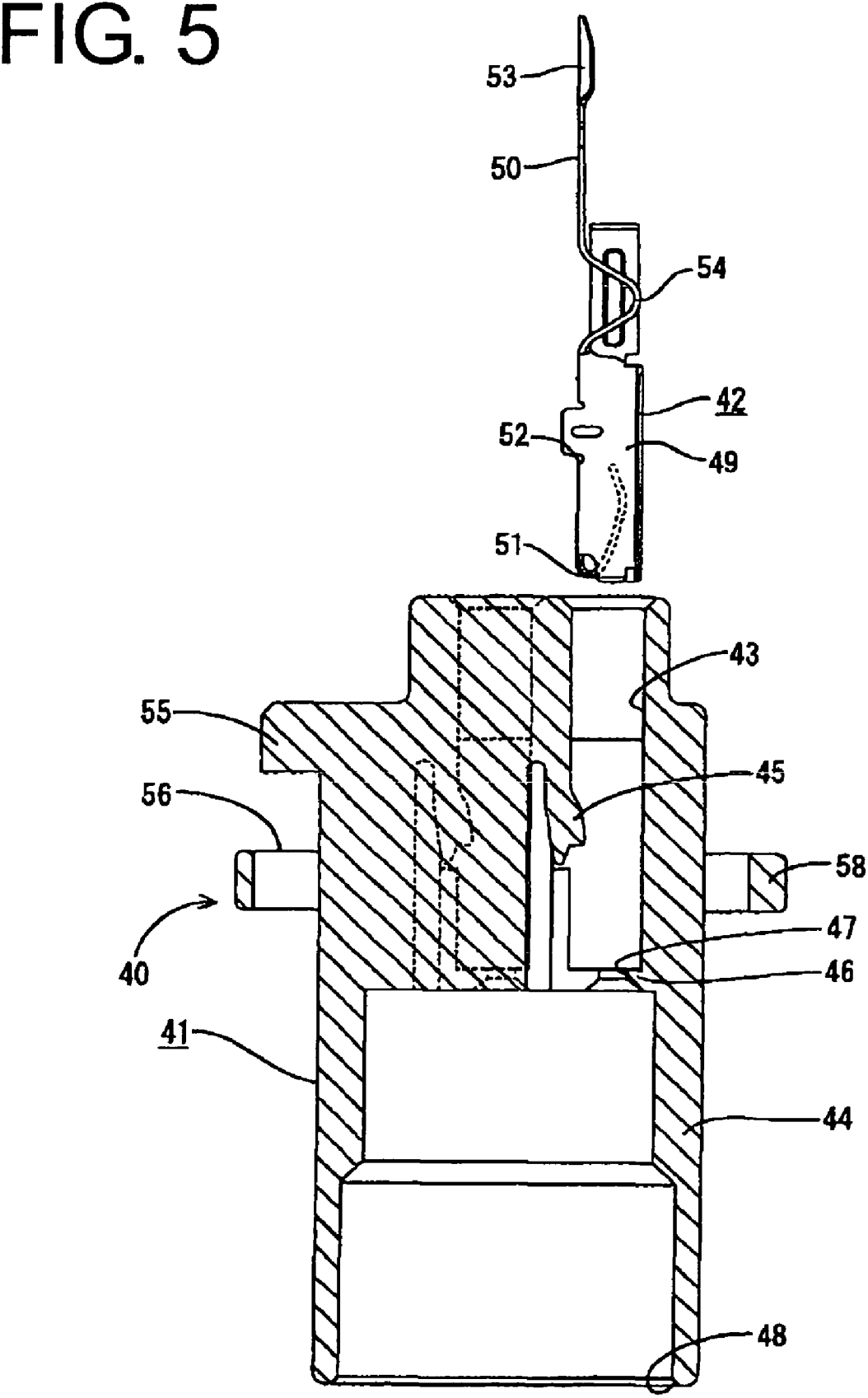
FIG. 5 is a side view in section showing a terminal fitting and the connector housing.

As shown in FIGS. 3 to 5, each intermediate connector 40 includes a housing 41 made e.g. of a synthetic resin and terminal fittings 42 are accommodated in the housing 41. The housing 41 has a substantially cylindrical shape, and the outer diameter is smaller than the diameter of the opening 20. Cavities 43 are formed at an upper part of the housing 41 and have open upper and lower ends. The cavities 43 receive the terminal fittings 42 from above and in a direction substantially opposite the connecting direction CD. A fittable tube 44 is formed at a lower part of the housing 41 and communicates with the respective cavities 43. The pressure sensor 30 is fit into the fittable tube 44 from below and substantially in a connection direction CD. A resiliently deformable lock 45 is provided in each cavity 43 for engaging the inserted terminal fitting 42 so as not to come out upward. A bottom wall 46 of each cavity 43 can support the inserted terminal fitting 42 at its bottom end position. The bottom wall 46 has a terminal insertion hole 47 through which the corresponding terminal 32 of the pressure sensor 30 is insertable substantially in the connecting direction CD, and a guiding surface is formed at the bottom edge of the terminal insertion hole 47 for guiding the insertion of the corresponding terminal 32. The respective cavities 47 are arranged at vertices of a triangle (see FIG. 3(A)). The fittable tube 44 is stepped so that the inner diameter of an upper part is larger than that of a lower part, and the inner diameter of this lower part is substantially equal to the outer diameter of the large-diameter portion 34 of the pressure sensor 30. The length of the fittable tube 44 is substantially equal to or longer than a sum of the length of the terminals 32 of the pressure sensor 30 and the length of the small-diameter portion 33. A slanted or rounded guiding surface 48 is formed circumferentially on the inner peripheral edge of the bottom end of the fittable tube 44.

Each terminal fitting 42 has a shape shown in FIG. 5 preferably by press-working a conductive metal plate or blank and provided with a main portion 49 substantially in the form of a rectangular tube and an extending piece 50 extending substantially up along the connecting direction CD from the main portion 49. The main portion 49 is vertically hollow, and a resilient contact piece 51 which can be brought resiliently into contact with, i.e. separably connected with the terminal 32 of the pressure sensor 30 is provided inside the main portion 49. The resilient contact piece 51 is angled by folding up a plate piece extending from a wall of the main portion 49. Further, the main portion 49 is formed with a locking hole 52 for permitting the entrance of the lock 45, which is engageable with the edge of the locking hole 52.

The extending piece 50 extends from the same wall of the main portion 49 where the resilient contact piece 51 is provided. The leading end of the extending piece 50 projects up in the connecting direction CD from the housing 41 in an inserted state of the terminal fitting 42, and serves as a board-side connecting portion 53 which is introduced through the insertion hole in the printed circuit board 13 and inseparably connected with the conductive path by soldering, welding or the like. A stress-relieving portion 54 is formed at the base end of the extending piece 50 and is bent to have a substantially undulated or substantially V-shaped side view. The stress-relieving portion 54 is resiliently deformable. Thus, the board-side connecting portion 53 and the main portion 49 (including the resilient contact piece 51) are permitted to make relative vertical and/or horizontal displacements, thereby alleviating the concentration of a stress on a soldered portion of the board-connecting portion 53.

Figure 6A:
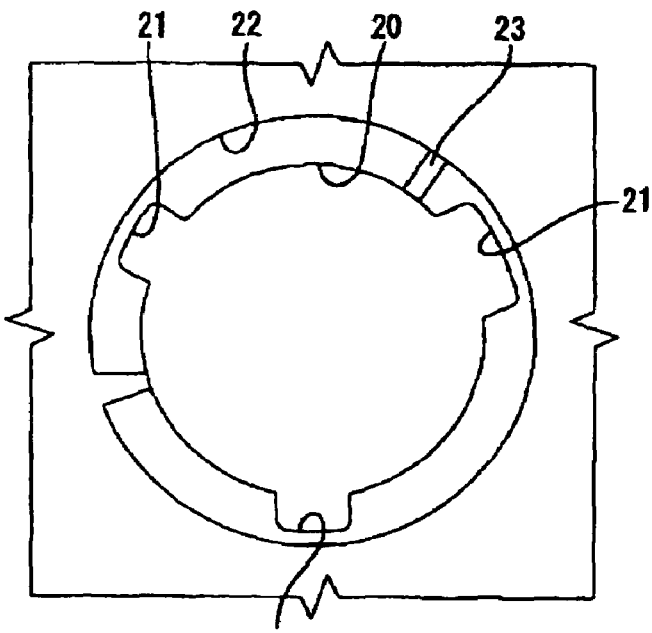
FIGS. 6(A) and 6(B) are a plan view and a bottom view of an opening.

Three holding portions 55 and a flange 56 are provided on the outer circumferential surface of each housing 41 for holding the intermediate connector 40 mounted in the first electronic control unit 10 by tightly holding an edge 20a of the opening 20 from opposite sides. The holding portions 55 are substantially in the form of blocks and arranged at positions spaced apart at substantially even angular intervals on the outer circumferential surface of the housing 41. On the other hand, the flange 56 has a substantially circular shape and is formed substantially over substantially the entire outer circumferential surface of the housing 41. As shown in FIG. 6, three notches 21 through which the respective holding portions 55 can pass are provided at positions at the peripheral edge of the opening 20 substantially corresponding to the respective holding portions 55, and an escaping recess 22 for escaping the holding portions 55 is formed in the upper surface of the board mounting portion 15 to substantially face the opening 20. The diameter of the escaping recess 22 is larger than that of the opening 20. Accordingly, the housing 41 is inserted into the opening 20 in a posture where the holding portions 55 align with the notches 21. The holding portions 55 pass through the notches 21 and escape into the escaping recess 22. The housing 41 then is turned by a specified angle about a longitudinal axis and along a circumferential direction of the intermediate connector 40 to engage the respective holding portions 55 with a peripheral surface 20b of the opening 20 (see FIG. 7). In other words, the intermediate connector 40 can be mounted into the opening 20 substantially in a fashion of a bayonet socket. The widest holding portion 55 has a turn-stopping projection (not shown) that engages a turn-stopping recess 23 in the peripheral upper surface 20b of the opening 20. Thus, the housing 41 is held at a substantially proper mount position and is prevented from turning.

As shown in FIG. 3, the flange 56 is formed with three cantilevered resilient pieces 58 by having slits 57 made therein. Each resilient piece 58 includes a substantially arcuate arm 59 extending substantially along the outer peripheral edge of the flange 56 (circumferential direction of the intermediate connector 40), and a projection 60 projecting radially out from the leading end of the arm 59. The resilient pieces 58 can engage a peripheral lower surface 20c of the opening 20 when the intermediate connector 40 is inserted into the opening 20 to escape the holding portions 55 into the escaping recess 22. The arms 59 are resiliently deformable along horizontal direction (substantially normal to an assembling direction or connecting direction CD of the two electronic control units 10, E) and are retracted into the slits 57 during the resilient deformation. The projections 60 project out from the flange 56, and arcuate guiding surfaces are formed on the outer surfaces thereof. The resilient pieces 58 are spaced apart at substantially even angular intervals and circumferentially displaced from the corresponding holding portions 55.

Figure 6B:
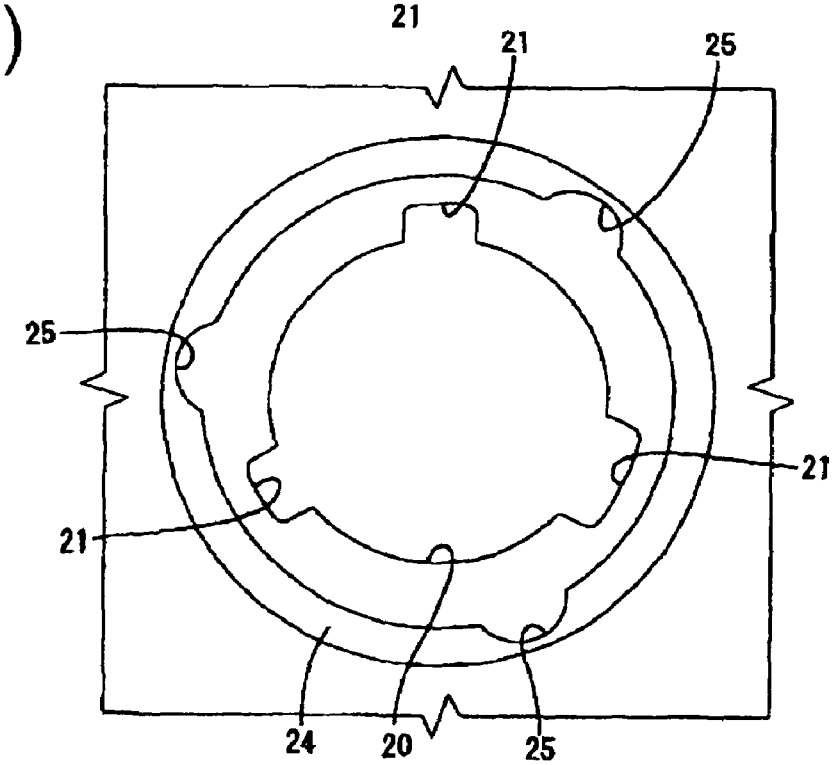

As shown in FIGS. 2 and 6(B), the receiving portion 24 projects down substantially along the connecting direction CD from the lower or mating surface of the board mounting portion 15 for receiving the respective resilient pieces 58. The receiving portion 24 has a substantially annular shape substantially concentric with the opening 20, and the inner diameter thereof is slightly larger than the outer diameter of the flange 56. A difference between these diameters is smaller than a projecting distance of the projections 60 from the arms 59. The inner peripheral edge of the receiving portion 24 is notched to form escaping portions 25 which come to positions substantially aligned with the projections 60 of the respective resilient pieces 58 when the respective holding portions 55 are aligned with the corresponding notches 21. Accordingly, the projections 60 of the respective resilient pieces 58 escape into the corresponding escaping portions 25 when the housing 41 is inserted into the opening 20. As the housing 41 is turned, the arcuate outer surfaces of the respective projections 60 are held substantially in sliding contact with the inner circumferential surface of the receiving surfaces 24. Thus, the respective arms 59 are deformed resiliently (see FIG. 7(B)) inwardly. In this state, the respective resilient pieces 58 are deformed further to permit the intermediate connector 40 to make a resilient displacement horizontally substantially normal to the assembling direction or connecting direction CD relative to the first electronic control unit 10.

Figure 7A:
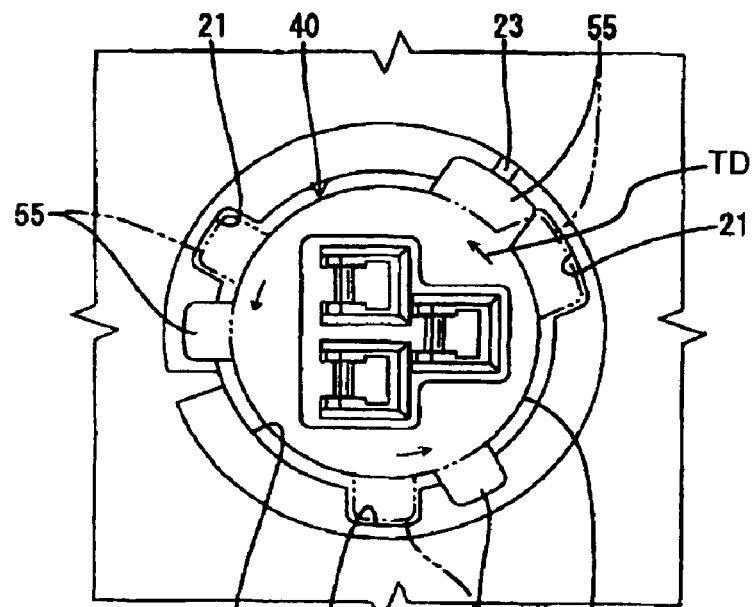
FIGS. 7(A) and 7(B) are a plan view and a bottom view showing an operation of turning the connector housing being mounted.
Figure 7B:
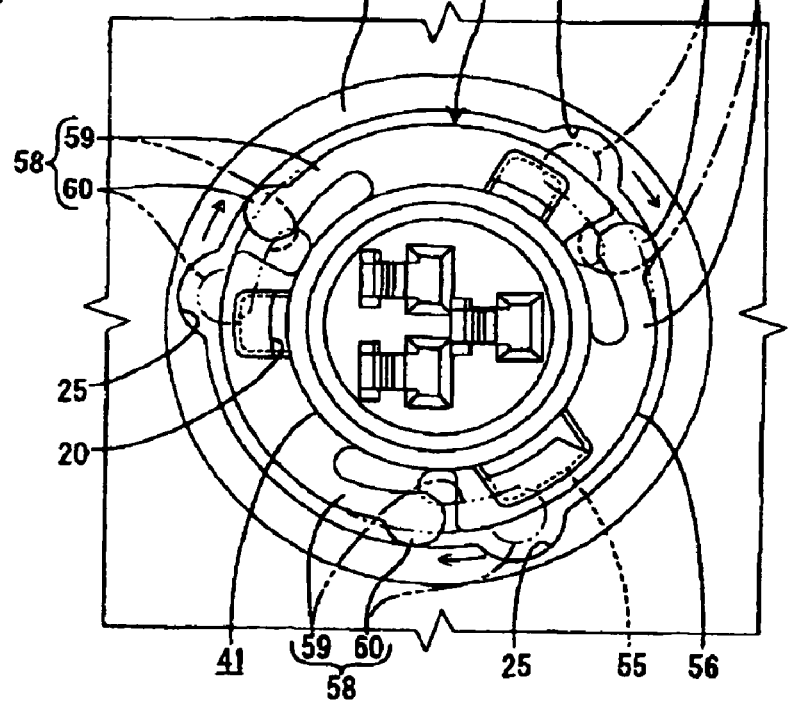
Figure 8:
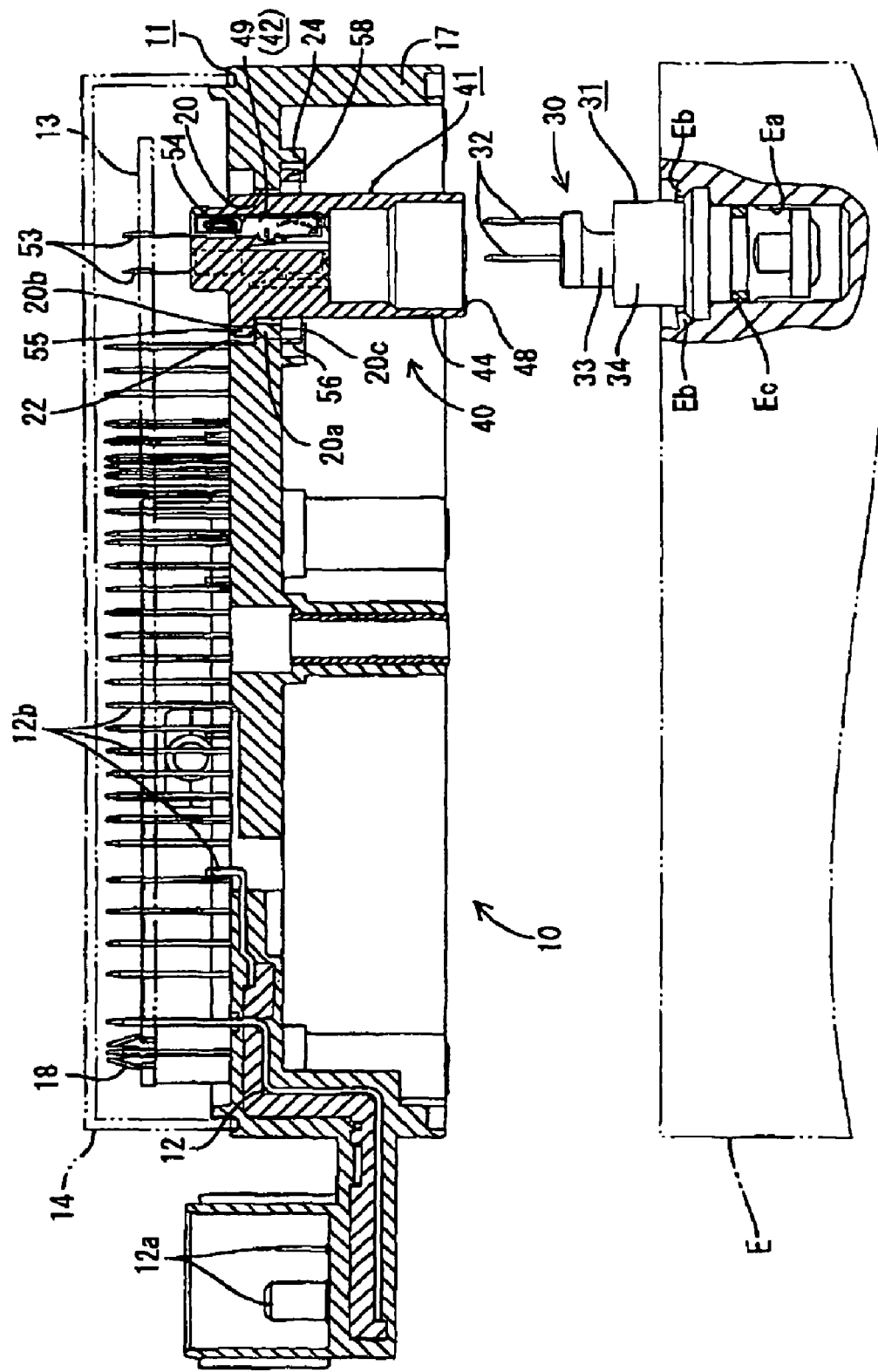
FIG. 8 is a side view in section showing a state where an intermediate connector is mounted in the first electronic control unit.

The intermediate connector 40 is mounted into the first electronic control unit 10 in the state shown in FIG. 2. More particularly, the housing 41 is held in a posture where the holding portions 55 align with the corresponding notches 21 and the projections 60 of the respective resilient pieces 58 align with the corresponding escaping portions 25. The housing 41 then is inserted into the opening 20 in the connecting direction CD from below. The housing 41 is turned about the longitudinal direction in a turning direction TD (direction of arrow as shown in FIG. 7) when the holding portions 55 reach the escaping recess 22 through the opening 20 and when the flange 56 contacts the peripheral lower surface 20c of the opening 20. As a result, the holding portions 55 misalign with the corresponding notches 21 and are engaged with the peripheral upper surface 20b of the opening 20. On the other hand, the outer surfaces of the projections 60 are held in sliding contact with the inner circumferential surface of the receiving portion 24 while the projections 60 come to misalign with the corresponding escaping portions 25. Thus, the arms 59 automatically deform resiliently. As a result, the intermediate connector 40 is aligned substantially concentrically with the opening 20. When the connector housing 41 is turned to a proper position, the turn-stopping projection engages the turn-stopping recess 23 to prevent the connector housing 41 from turning. At this time, as shown in FIG. 8, the edge 20a of the opening 20 is held tightly between the holding portions 55 and the flange 56 (including the resilient pieces 58), and the intermediate connector 40 is held mounted.

The printed circuit board 13 is mounted on the board mounting portion 15, and the device-side connecting portions 12b of the busbars 12 and the board-side connecting portions 53 of the terminal fittings 42 of the intermediate connectors 40 introduced through the insertion holes are connected with the conductive paths by soldering, welding, clamping, insertion fitting, etc. Further, the devices such as the coils are accommodated in the device-accommodating portion 17 and connected with the corresponding device-side connecting portions 12b. In addition, the pressure sensors 30 are fixed to the second electronic control unit E.

Figure 9:
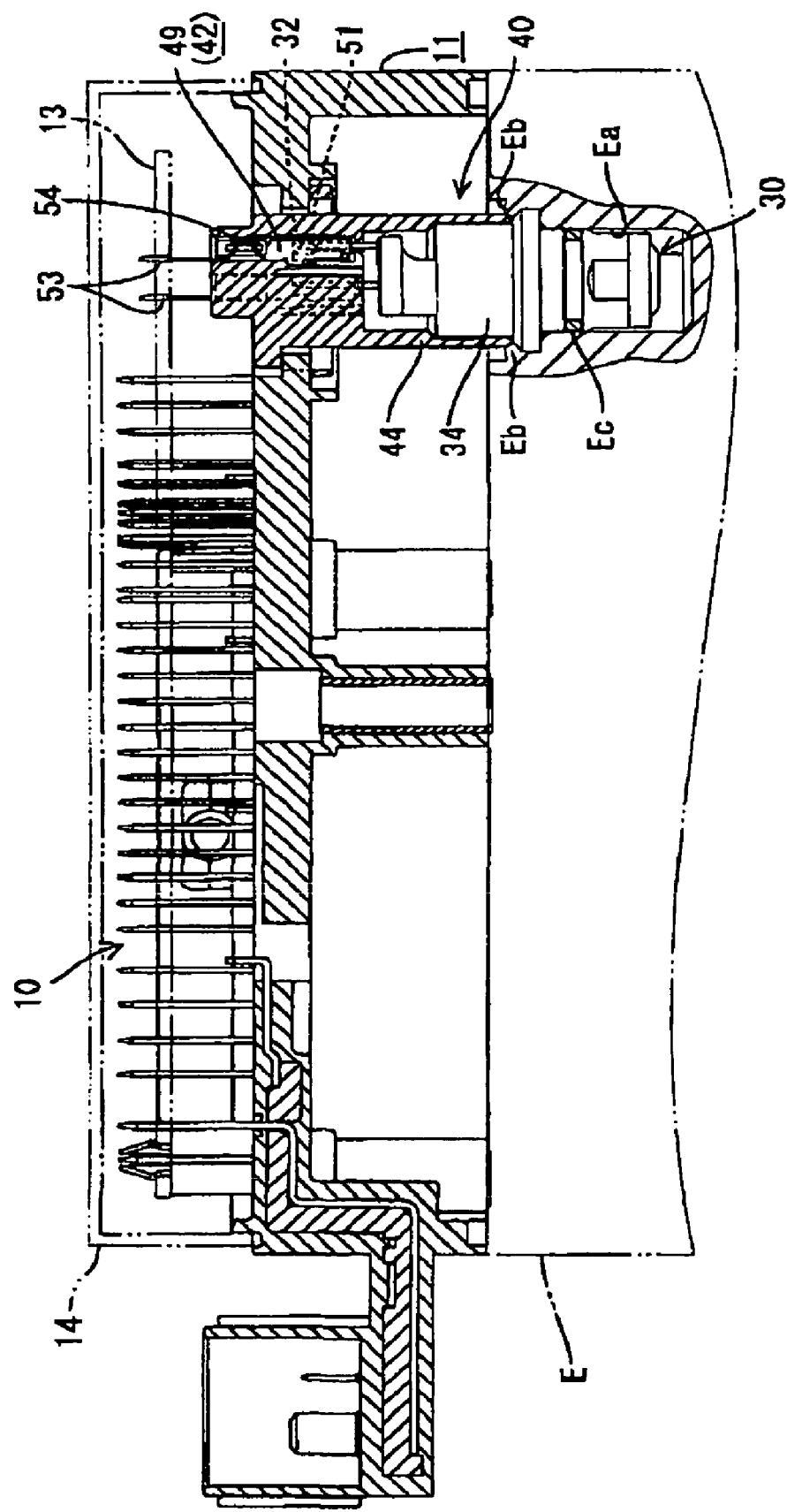
FIG. 9 is a side view in section showing a state where the two electronic control units are assembled.

Subsequently, the second electronic control unit E is assembled with the first electronic control unit 10 in the mounting direction MD. In a state shown in FIG. 8, the second electronic control unit E is assembled into the device accommodating portion 17 of the first electronic control unit 10. The sensor main bodies 31 of the pressure sensors 30 project up substantially along the connecting direction CD from the second electronic control unit E and are inserted into the respective fittable tubes 44 of the intermediate connectors 40. Additionally, the terminals 32 are inserted through the respective terminal insertion holes 47 into the respective main portions 49 of the terminal fittings 42 arranged in the cavities 43. As the two electronic control units 10, E are assembled as shown in FIG. 9, the resilient contact pieces 51 of the main portions 49 are brought resiliently into contact with the terminals 32. The terminals 32 and the resilient contact pieces 51 are held in sliding contact to create frictional resistances therebetween. Thus, the main portions 49 try to make upward displacements relative to the board-side connecting portions 53 fixed to the printed circuit board 13. At this time, the stress-relieving portions 54 are deformed resiliently to permit the relative displacements of the main portions 49 and the board-side connecting portions 53. Thus, the concentration of stresses on the soldered portions of the board-side connecting portions 53 can be alleviated. Thereafter, the assembled electronic control units 10, E are inseparably held by the unillustrated holding means.

Figure 10:
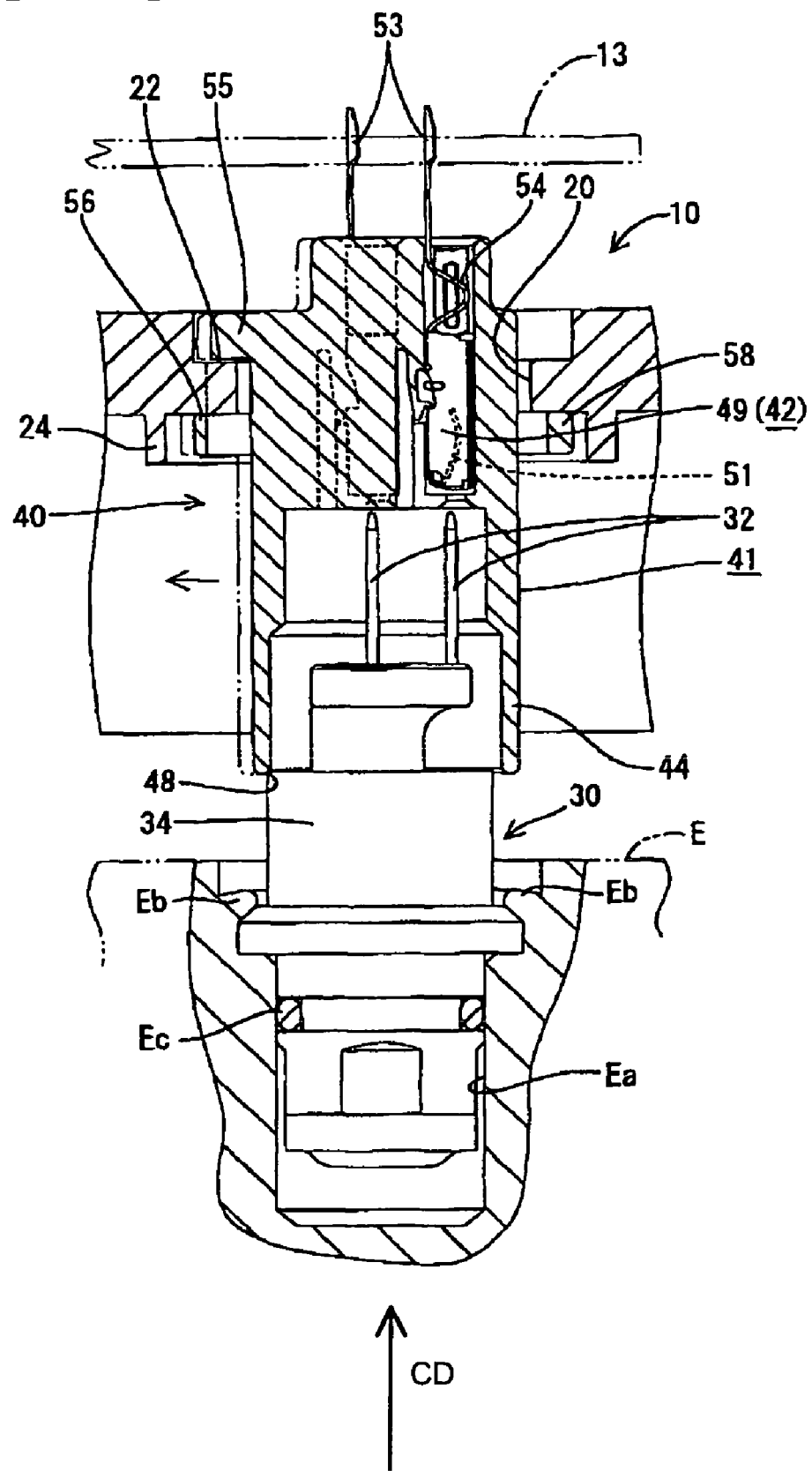
FIG. 10 is an enlarged side sectional view showing the intermediate connector taking up a displacement in an assembling process.

The two electronic control units 10, E may be displaced horizontally slightly in a direction aligned an angle to the assembling or mounting direction MD. Thus, the mount positions of the pressure sensors 30 (positions of the openings 20) may be displaced horizontally from their proper positions. Then, the pressure sensors 30 fit into the intermediate connectors 40 while being displaced in this direction. In such a case, the large-diameter portions 34 of the pressure sensors 30 contact the slanted or rounded guiding surfaces 48 of the fittable tubes 44 before the terminals 32 contact the terminal fittings 42, as shown in FIG. 10. If the assembling progresses from this state, the large-diameter portions 34 press the slanted guiding surfaces 48. As a result, the respective resilient pieces 58 deform resiliently to displace the intermediate connectors 40 relative to the first electronic control unit 10. In this way, the fittable tubes 44 substantially align with the large-diameter portions 34, and the displacements are taken up and corrected. Here, when the intermediate connectors 40 are displaced relative to the first electronic control unit 10, the main portions 49 try to be displaced relative to the board-side connecting portions 53 fixed to the printed circuit board 13 by soldering. At this time, the stress-relieving portions 54 deform resiliently to permit relative displacements of the main portions 49 and the board-side connecting portions 53. Thus, the concentration of stresses on the soldered portions of the board-side connecting portions 53 as the displacements are taken up can be alleviated.

The two electronic control units 10, E may have to be detached for maintenance or the exchange of the electronic control units. In such a case, the second electronic control unit E is pulled apart from the first electronic control unit 10 while the holding state of the holding means is canceled. As the two electronic control units 10, E are separated, the sensor main bodies 31 of the pressure sensors 30 are withdrawn from the fittable tubes 44 of the intermediate connectors 40 and the terminals 32 are disengaged from the resilient contact pieces 51 to cancel their contact states. Upon detaching the two electronic control units 10, E in this way, they can be easily detached since the connected states of the board-side connecting portions 53 of the terminal fittings 42 and the printed circuit board 13 need not be canceled. Thus, even if only one of the electronic control units 10 or E has an abnormality, only this electronic control unit 10/E can be exchanged easily and at a low-cost. In the detaching process, frictional resistance acts between the terminals 32 and the resilient contact pieces 51 as in the assembling process. However, the stress relieving portions 54 deform resiliently to permit relative displacements of the main portions 49 and the board-side connecting portions 53 at this time as well. Therefore, the concentration of stresses on the soldered portions is alleviated.

As described above, the pressure sensors 30 mounted in the second electronic control unit E are separably connected with the resilient contact pieces 51 of the terminal fittings 42 of the intermediate connectors 40 provided in the first electronic control unit 10. Thus, the connected states of the inseparably connected board-side connecting portions 53 and the printed circuit board 13 need not be canceled upon detaching the two electronic control units 10, E. Therefore, the electronic control units 10, E can be detached easily.

The two electronic control units 10, E may be displaced in the direction intersecting the assembling or mounting direction MD during assembly. Thus, the resilient pieces 58 held in contact with the receiving portions 24 are deformed resiliently, and the intermediate connectors 40 are displaced resiliently relative to the first electronic control unit 10 to take up displacements. Thus, the terminals 32 of the pressure sensors 30 are connected smoothly with the terminal fittings 42 of the intermediate connectors 40.

Further, the resilient pieces 58 are engageable with the peripheral lower surface 20c of the opening 20 when the intermediate connector 40 is mounted into the opening 20, i.e. has a function of holding the intermediate connector 40 in addition to a displacement take-up function. Thus, the construction can be simplified.

A second embodiment of the invention is described with reference to FIGS. 11 to 18. In this second embodiment, intermediate connectors 40A and openings 20A have modified constructions. In this embodiment, no repetitive description is given on the similar or same construction as the first embodiment by identifying it by the same reference numerals.

Figure 11:
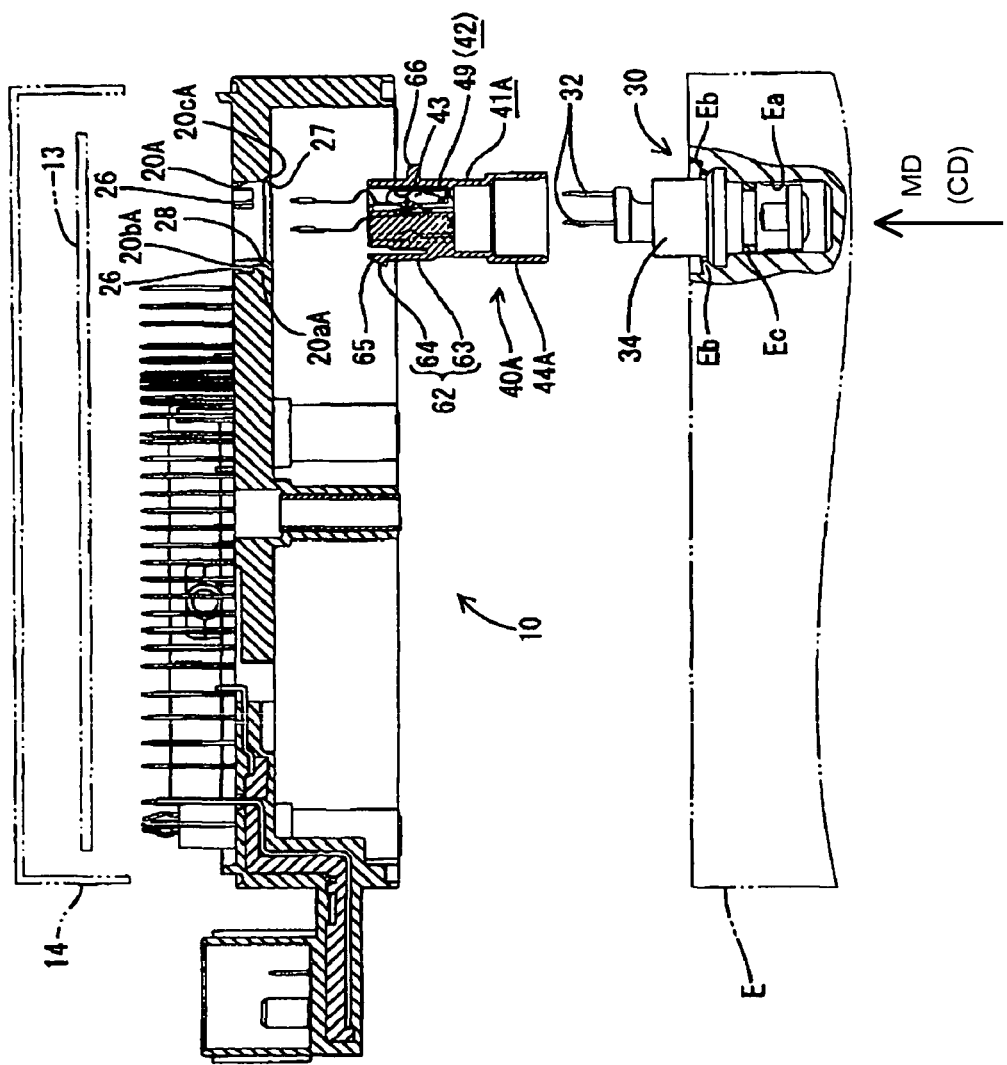
FIG. 11 is an exploded side view in section showing two electronic control units according to a second embodiment of the present invention.
Figure 12A:
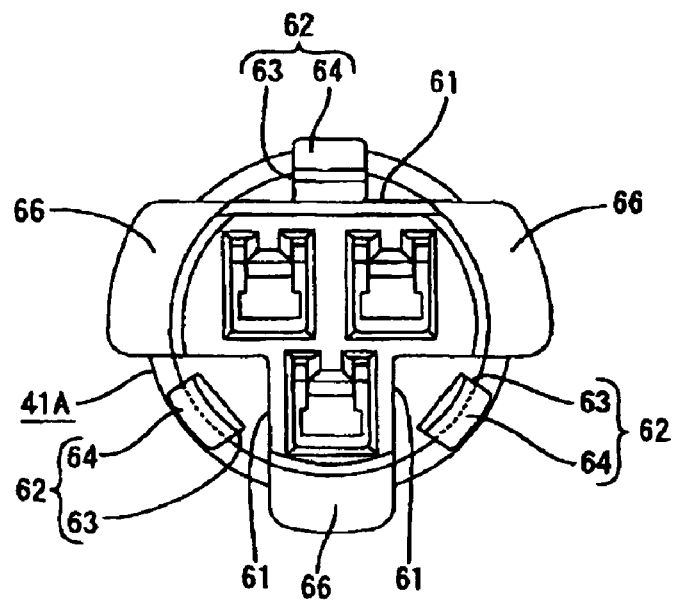
FIGS. 12(A) and 12(B) are a plan view and a bottom view of a connector housing.
Figure 12B:
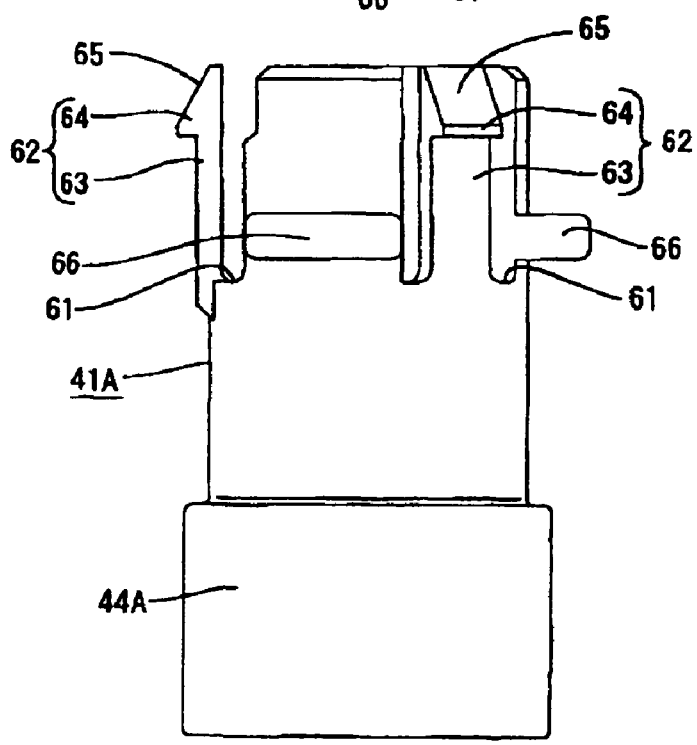

As shown in FIG. 11 or 12, a housing 41A of each intermediate connector 40A has a substantially cylindrical shape, and three resilient pieces 62 are provided by forming respective slits 61, which are open upward and sideways, at portions of an upper part of the housing 41A at the outer sides of the respective cavities 43. The respective resilient pieces 62 are arranged at positions spaced apart preferably at substantially even angular intervals in circumferential direction. Each resilient piece 62 includes a cantilevered arm 63 extending substantially upward (assembling or mounting direction MD of the two electronic control units 10, E), and a lock 64 projects sideways from the outer surface of the leading end of the arm 63. The arm 63 is resiliently deformable substantially along horizontal direction substantially normal to the assembling or mounting direction MD of the two electronic control units 10, E. The arm 63 is retracted into the slit 61 or radially inwardly during the resilient deformation. The outer surfaces of the arms 63 can be held substantially in contact with the inner circumferential surface of the opening 20A when the housing 41A is mounted into the opening 20A. Accordingly, the arms 63 received by the edge 20aA of the opening 20A are resiliently deformed, thereby enabling the housing 41A to be horizontally displaced substantially normal to the assembling or mounting direction MD of the two electronic control units 10, E) relative to the first electronic control unit 10. In other words, the edge 20aA of the opening 20A has a function similar to that of the receiving portion 24 shown in the first embodiment, and the displacement take-up means is formed by the resilient pieces 62 and the edge 20aA of the opening 20A.

Figure 13A:
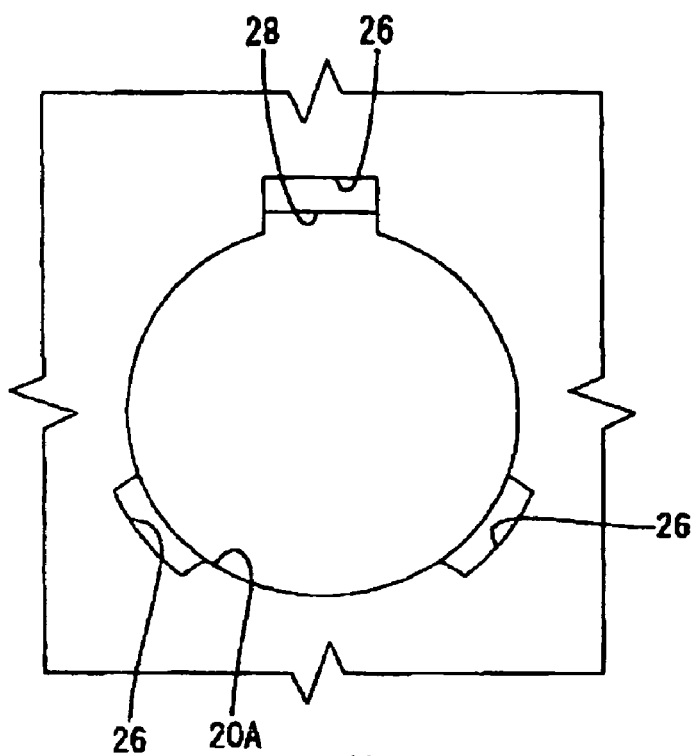
FIGS. 13(A) and 13(B) are a plan view and a bottom view of an opening.
Figure 13B:
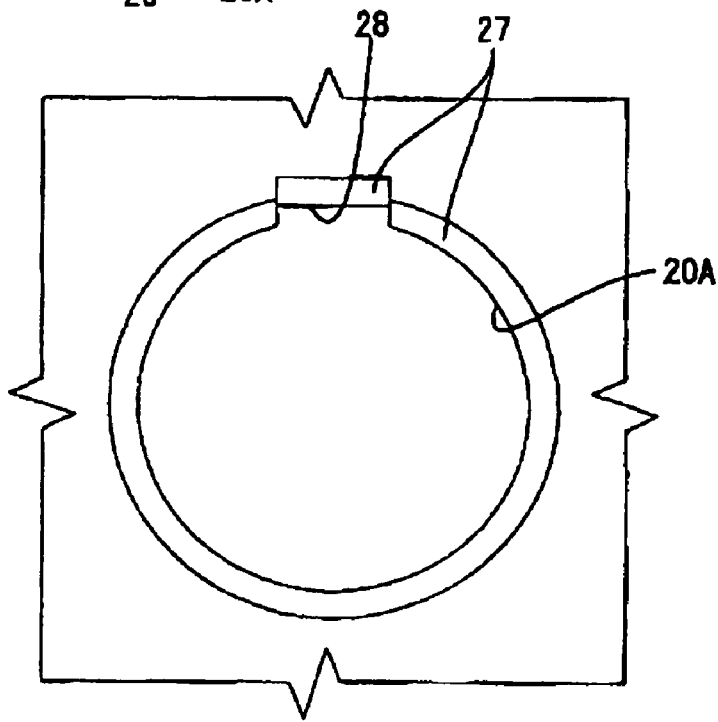

As shown in FIGS. 11 and 13, three escaping recesses 26 are formed in the upper surface of the board mounting portion 15A and face the corresponding openings 20A for escaping the locks 64. The lower surfaces of the escaped locks 64 engage peripheral upper surfaces 20bA of the openings 20A. Each lock 64 is tapered toward its leading end and has a slanted or rounded guiding surface 65 on its outer surface. Further, a slanted or rounded guiding surface 27 is formed substantially circumferentially along the bottom end of the edge 20aA of each opening 20A for sliding contact with the slanted or rounded guiding surfaces 65 of the locks 64. The resilient piece 62 at an upper side in FIG. 12(A) (right side in FIG. 12(B)) is formed so that the arm 63 bulges out from the outer circumferential surface of the housing 41A, and the peripheral edge of the opening 20A is recessed to correspond to the arm 63, thereby forming an escaping portion 28 for escape of the arm 63. Thus, the housing 41A can be inserted into the opening 20A and positioned circumferentially to align the resilient piece 62 with the escaping portion 28.

As shown in FIGS. 11 and 12, three holding portions 66 bulge out radially substantially normal to the mounting direction MD at positions of the outer circumferential surface of the housing 41A circumferentially displaced from the respective resilient pieces 62. The respective holding portions 66 are spaced apart at substantially even angular intervals. The holding portions 66 are made engageable with a peripheral lower surface 20cA of the opening 20A by being spaced apart from the corresponding locks 64 by a distance substantially equal to the thickness of the edge 20aA of the opening 20A. Thus, the holding portions 66 can tightly hold the edge 20aA of the opening 20A in cooperation with the locks 64.

Figure 14:
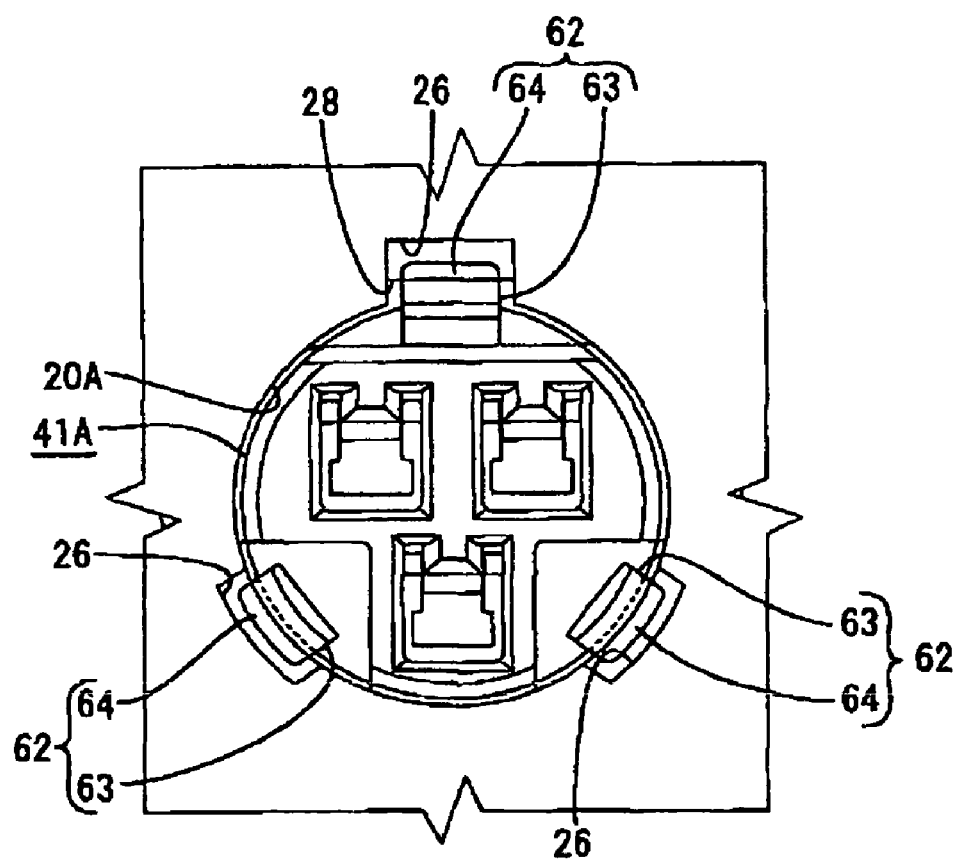
FIG. 14 is a plan view showing a state where an intermediate connector is mounted in the opening.
Figure 15:
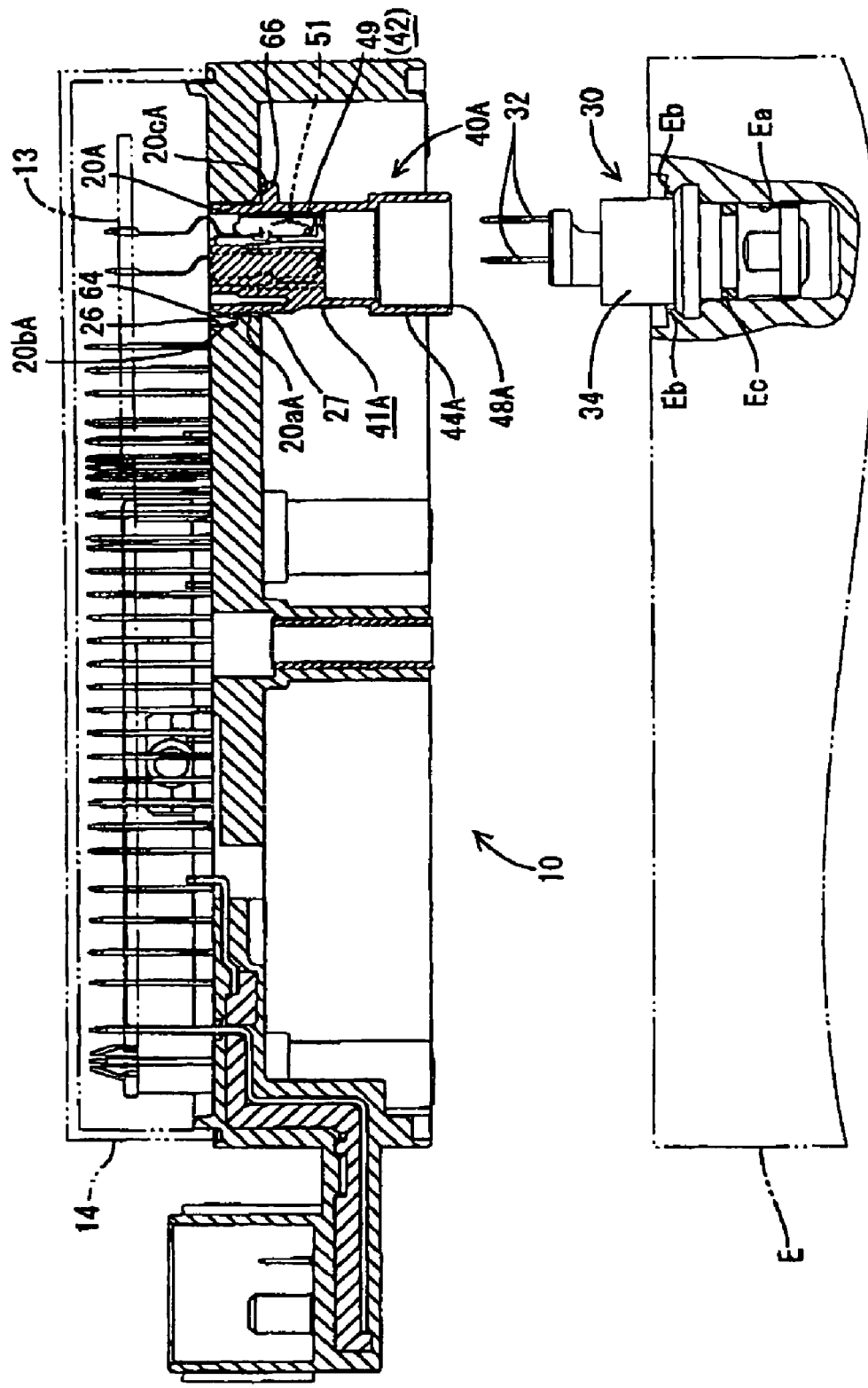
FIG. 15 is a side view in section showing a state where the intermediate connector is mounted in the electronic control unit.

Upon assembling the two electronic control units 10, E, the second electronic control unit E having the pressure sensors 30 fixed thereto can be assembled with the first electronic control unit 10 after the intermediate connectors 40A are mounted into the first electronic control unit 10 as in the first embodiment. More specifically, the housing 41A is held in a posture where the resilient piece 62 aligns with the escaping portion 28 and is inserted into the opening 20A from below. Then, the slanted or rounded guiding surfaces 27, 65 of the opening 20A and the locks 64 come into sliding contact, thereby resiliently deforming the respective arms 63. The housing 41A is pushed until the upper surfaces of the holding portions 66 contact the peripheral lower surface 20cA of the opening 20A. Thus, the locks 64 escape into the escaping recesses 26 and the arms 63 restore resiliently to engage the lower surfaces of the locks 64 with the peripheral upper surface 20bA of the opening 20A as shown in FIGS. 14 and 15. In this way, the locks 64 and the holding portions 66 tightly hold the edge 20aA of the opening 20A therebetween to hold the intermediate connector 40A mounted.

Figure 16:
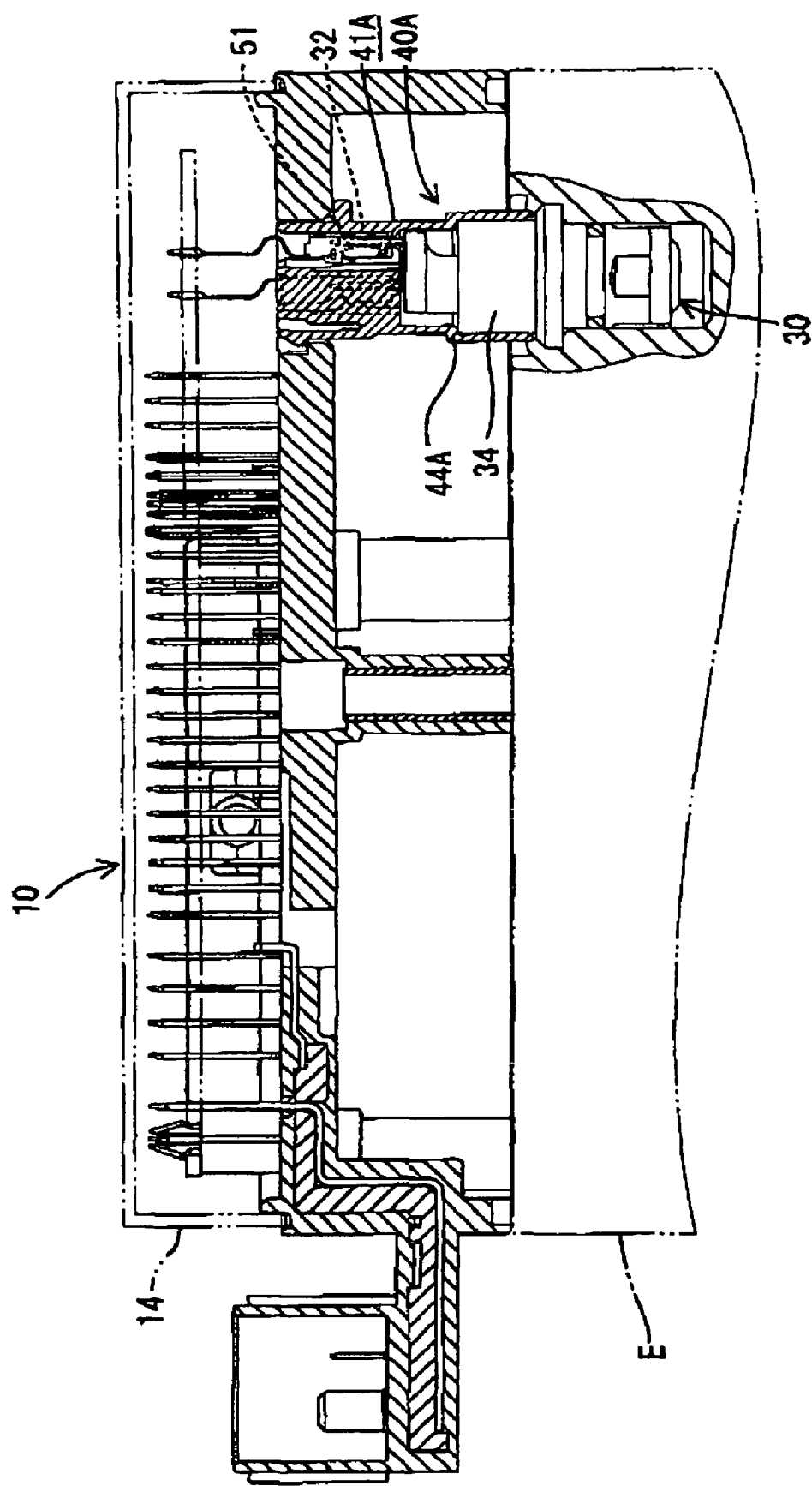
FIG. 16 is a side view in section showing an assembled state of the two electronic control units.
Figure 17:
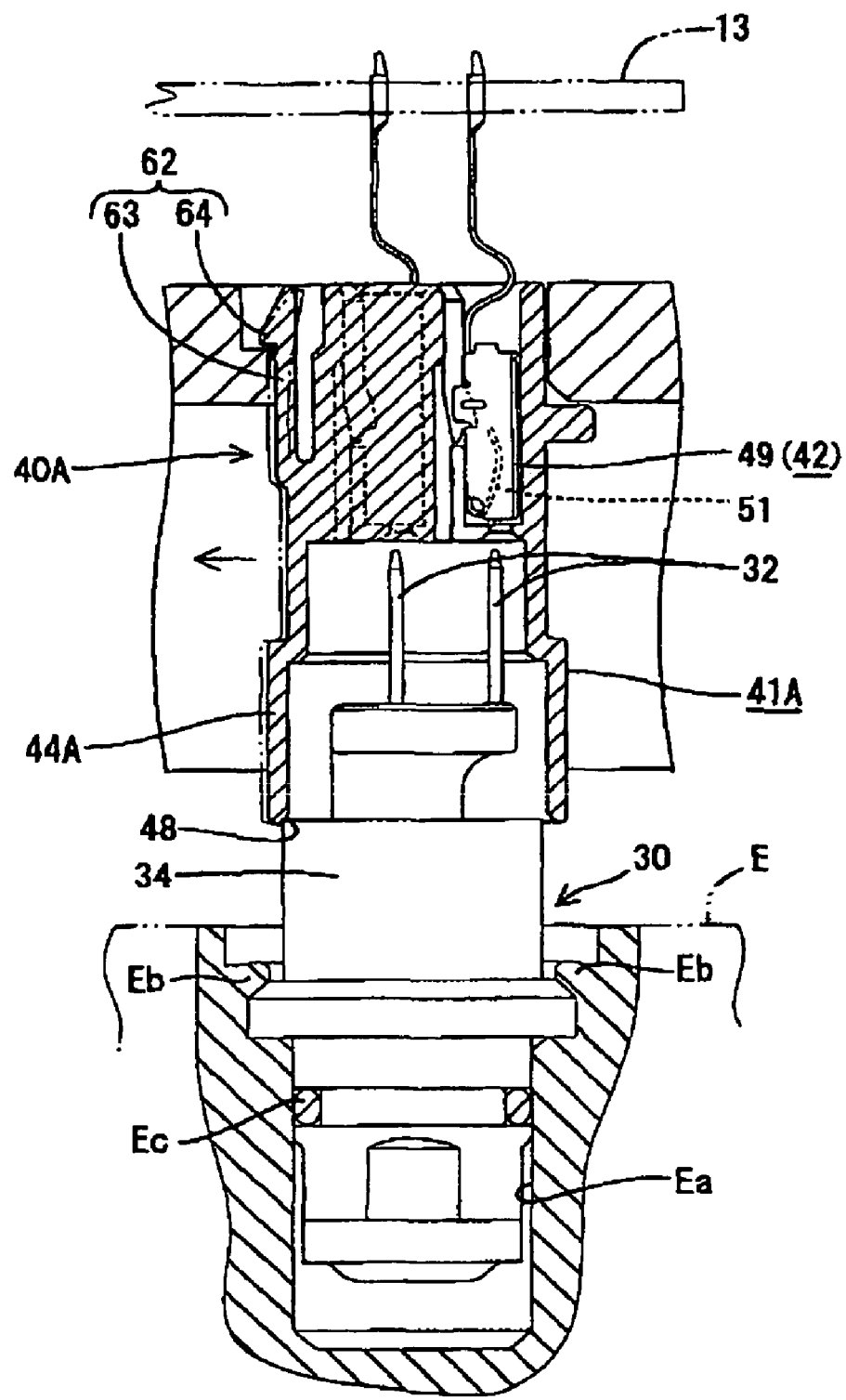
FIG. 17 is an enlarged side view in section showing the intermediate connector taking up a displacement in an assembling process.

Subsequently, the second electronic control unit E is assembled with the first electronic control unit 10 in the mounting direction MD from below. Thus, the large-diameter portions 34 of the pressure sensors 30 are fit into the respective fittable tubes 44A and the resilient contact pieces 51 enter the main portions 49 of the terminal fittings 42, as shown in FIG. 16, and contact the respective terminals 32. The two electronic control units 10, E may undergo a horizontal displacement during the assembly and may be displaced in a direction substantially normal to the assembling or mounting direction MD of the two electronic control units 10, E. However, the large-diameter portions 34 of the pressure sensors 30 contact the slanted or rounded guiding surfaces 48A of the fittable tubes 44A as shown in FIG. 17 before the terminals 32 contact the terminal fittings 42. If the assembling progresses from this state, the large-diameter portions 34 push the slanted guiding surfaces 48A. Thus, the arms 63 of the respective resilient pieces 62 are deformed resiliently while being received by the edge 20aA of the opening 20A, and the intermediate connectors 40A are displaced relative to the first electronic control unit 10. In this way, the pressure sensors 30 and the intermediate connectors 40A are aligned and, as a result, the respective terminals 32 can be connected smoothly with the resilient contact pieces 51 of the terminal fittings 42.

In the second embodiment, the locks 64 and the respective openings 20A have the slanted or rounded guiding surfaces 65, 27, and the intermediate connectors 40A can be mounted only by being pushed up along the assembling or mounting direction MD of the two electronic control units 10, E into the openings 20A. Accordingly, another assembling method can be adopted in the second embodiment. Specifically, the second electronic control unit E is assembled with the first electronic control unit 10 after the intermediate connectors 40A are connected with the pressure sensors 30 fixed to the second electronic control unit E to be made integral to the second electronic control unit E. The intermediate connectors 40A then can be mounted into the respective openings 20A.

Figure 18:
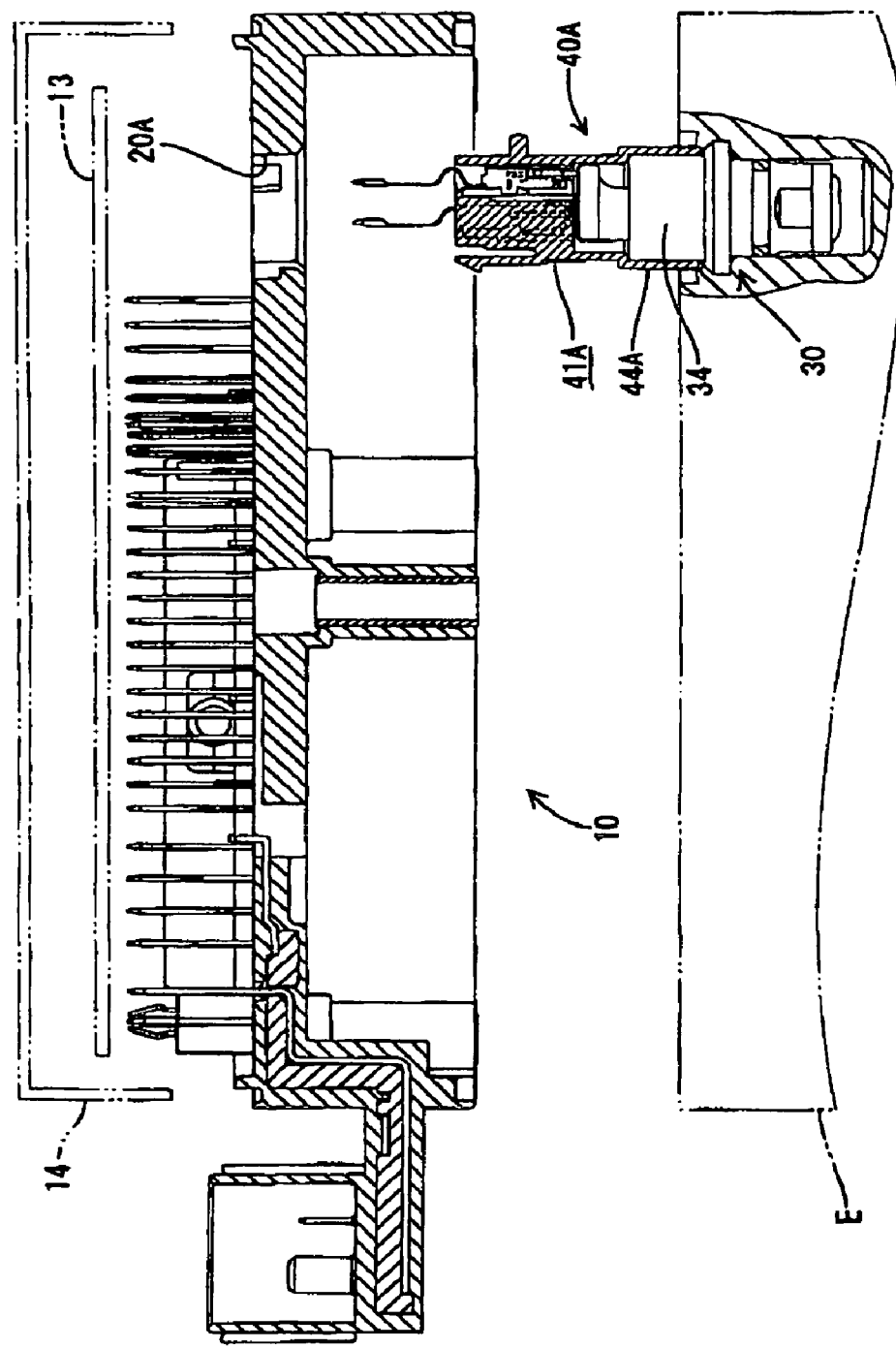
FIG. 18 is a side view in section showing a state where the intermediate connector is connected with a pressure sensor before the two electronic control units are assembled.
Figure 19:
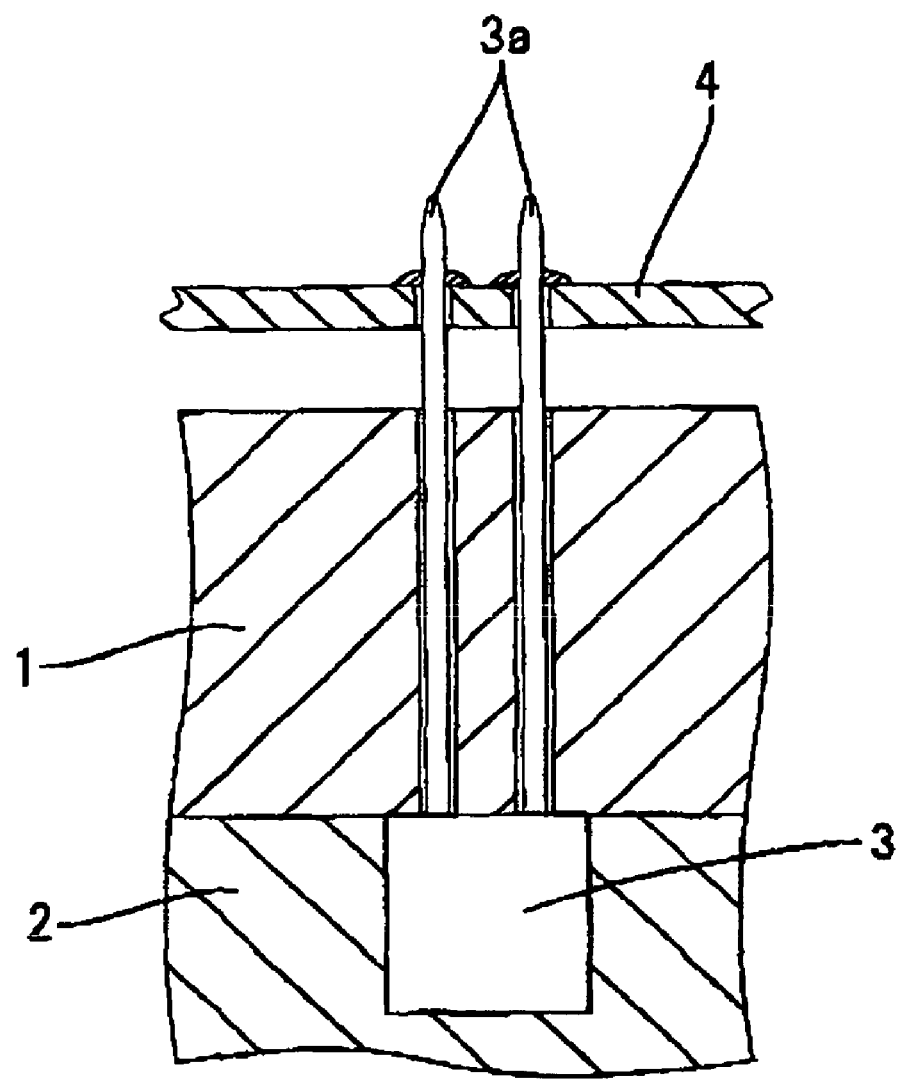
FIG. 19 is a diagram of a prior art construction for connecting a circuit board and an electrical part.

Specifically, as shown in FIG. 18, the fittable tube 44A of each intermediate connector 40A is fit on the corresponding pressure sensor 30 fixed to the second electronic control unit E from above. At this time, the intermediate connector 40A is fit while substantially being circumferentially positioned with respect to the pressure sensor 30, so that the respective terminals 32 can be brought resiliently into contact with the resilient contact pieces 51 of the terminal fittings 42. Thereafter, the second electronic control unit E is assembled with the first electronic control unit 10. Then, the intermediate connectors 40A are inserted into the openings 20A in the mounting direction MD from below, and the slanted or rounded guiding surfaces 27, 65 of the openings 20A and the locks 64 come into sliding contact to resiliently deform the arms 63. Even if the two electronic control units 10, E undergo a horizontal displacement in this assembling process and displace in a direction substantially normal to the assembling or mounting direction MD of the two electronic control units 10, E, the arms 63 of the resilient pieces 62 deform resiliently to take up the displacement while being received by the edges 20aA of the openings 20A. When the two electronic control units 10, E are assembled properly, the arms 63 restore resiliently and the locks 64 and the holding portions 66 engage the edges 20aA of the openings 20A to hold them therebetween. In this way, the intermediate connectors 40A are mounted into the first electronic control unit 10. Thereafter, the printed circuit board 13 is mounted on the board mounting portion 15, and the device-side connecting portions 12b of the busbars 12 and the board-side connecting portions 53 of the terminal fittings 42 are inserted into the corresponding insertion holes and soldered (see FIG. 16). It should be noted that the printed circuit board 13 may be mounted on the board mounting portion 15 beforehand and then the second electronic control unit E having the intermediate connectors 40A incorporated therein may be assembled with the first electronic control unit 10.

As described above, the slanted or rounded guiding surfaces 27, 65 guide the arms 63 to undergo resilient deformations as the intermediate connectors 40A are mounted into the openings 20A substantially along the assembling or mounting direction MD of the two electronic control units 10, E. Thus, the mounting direction MD of the intermediate connectors 40A into the first electronic control unit 10 and the assembling direction MD of the second electronic control unit E with the first electronic control unit 10 substantially coincide. Accordingly, the intermediate connectors 40A can be mounted into the unit main body 11 of the first electronic control unit 10 as the two electronic control units 10, E are assembled. Therefore, the method for assembling the two electronic control units 10, E after mounting the intermediate connectors 40A into the first electronic control unit 10 and the method for connecting the intermediate connectors 40A with the pressure sensors 30 before assembling the two electronic control units 10, E can be adopted selectively. As a result, the assembling method can be diversified. Further, since the resilient pieces 62 have the function of holding the intermediate connectors 40A in addition to the function of taking up displacements, the construction can be simplified.

The invention is not limited to the above described and illustrated embodiments. For example, the following embodiments are also embraced by the technical scope of the present invention as defined by the claims. Beside the following embodiments, various changes can be made without departing from the scope and spirit of the present invention as defined by the claims.

Although the pressure sensors are shown as electrical or electronic parts in the foregoing embodiments, the invention is also applicable to electronic control units using, for example, temperature sensors, current sensors, magnetic field sensors, etc. The number and positions of the pressure sensors in the unit main body can be set arbitrarily.

Although the housing of each intermediate connector is mounted through the opening in the foregoing embodiments, it may be mounted at a height where the upper end surface of the housing is at an intermediate position of the opening provided that the terminal fittings are arranged through the opening according to the present invention.

Although two electronic control units are assembled in the foregoing embodiments, the invention is also applicable to cases where a different number, e.g. one or three or more electronic control units are assembled.

Although the electronic control units are illustrated as unit boxes in the foregoing embodiments, the invention is also applicable to junction boxes, relay boxes and the like.

Although the resilient pieces provided on the intermediate connectors form the displacement take-up means in the foregoing embodiments, they may be formed to possess only the function of holding the intermediate connectors, and displacement take-up means made of, e.g. spring members may be provided separately from the resilient pieces.

The resilient pieces are provided on the intermediate connectors and the receiving portions are provided in the unit main body in the foregoing embodiments. Conversely, the unit main body may be provided with the resilient pieces and the intermediate connectors may be provided with the receiving portions according to the invention.

Even though the circuit board has been described as being embodied by a printed circuit board 13, it should be understood that the invention is applicable to any kind of circuit board being made e.g. by laying wiring in a specific pattern or by any other electric/electronic circuitry.

What is claimed is:

1. A construction for electrically connecting a circuit board in a first unit box and an electrical part in a second unit box as the first and second unit boxes are assembled, the electrical part having at least one terminal fitting, the first unit box having an intermediate connector with at least one terminal fitting having a first portion inseparably connectable with the circuit board and the terminal fitting further having a second portion separably connectable with the terminal of the electrical part so that the second unit box and the terminal fitting thereof can be detached from the first unit box and the terminal fitting thereof, wherein the intermediate connector is mounted in the first unit box via a displacement take-up means for resilient displacement relative to the first unit box in a direction intersecting with an assembling direction of the two unit boxes.

2. The construction of claim 1, wherein:
the intermediate connector is mounted with the terminal fitting inserted through a mounting portion in a unit main body of the first unit box, and
the displacement take-up means includes at least one resilient piece on one of the intermediate connector and the unit main body and being resiliently deformable in the direction intersecting with the assembling direction, and a receiving portion on the other of the intermediate connector and the unit main body for receiving the resilient piece.

3. The construction of claim 2, wherein the intermediate connector includes at least one holding portion engageable with the mounting portion as the intermediate connector is turned along a circumferential direction after being inserted into the mounting portion, and the resilient piece extends substantially along the circumferential direction of the intermediate connector and is engageable with a side of the mounting portion substantially opposite from the side where the holding portion is to be engaged with the mounting portion.

4. The construction of claim 2, wherein the resilient piece extends substantially along the assembling direction of the two unit boxes and includes a resiliently deformable arm and a lock engageable with a side of the mounting portion substantially opposite from the side where the intermediate connector is to be mounted.

5. The construction of claim 4, wherein at least one of the lock and the mounting portion has a guiding surface for guiding the arm to undergo a resilient deformation as the intermediate connector is mounted along the assembling direction of the two unit boxes.

6. A brake oil pressure control unit comprising the construction for connecting a circuit board and an electrical part of claim 1.

* * * * *

UNITED STATES PATENT AND TRADEMARK OFFICE
CERTIFICATE OF CORRECTION

PATENT NO. : 7,044,751 B2
APPLICATION NO. : 10/912612
DATED : May 16, 2006
INVENTOR(S) : Hitoshi Takanashi et al.

It is certified that error appears in the above-identified patent and that said Letters Patent is hereby corrected as shown below:

Title Page Col. 1 line 1-2
(73) Assignees: Sumitomo Wiring Systems, Ltd. (JP);
ADVICS Co., Ltd. (JP)

Signed and Sealed this

Fifteenth Day of August, 2006

JON W. DUDAS
*Director of the United States Patent and Trademark Office*